J. Richards,
Guide for Scroll Saws,
No. 1,527. Reissued Aug. 25, 1863.
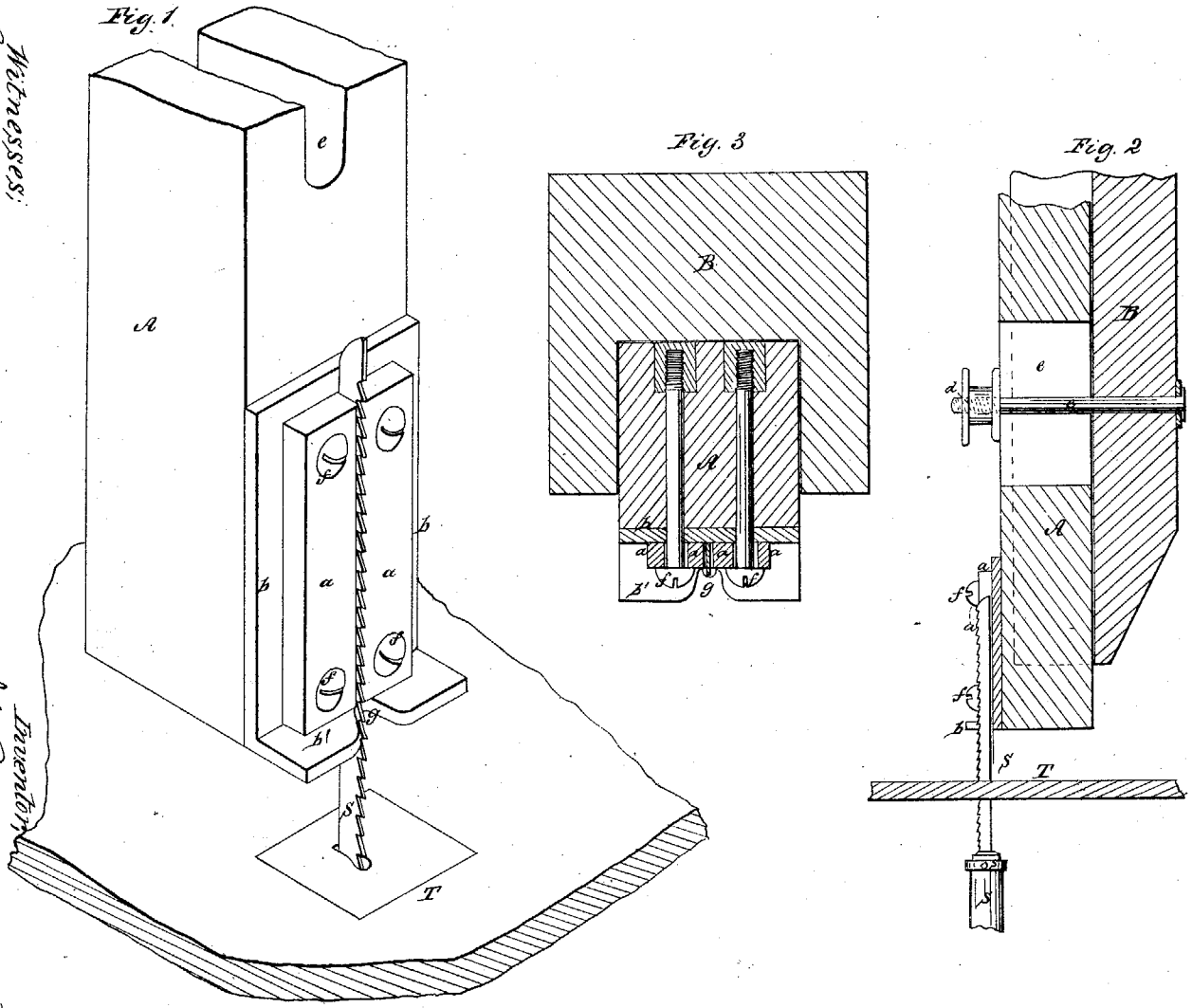
Witnesses;
Gustavus Dittrich
Edwin S. Jacob
Inventor;
John Richards
Mason Fenwick & Lawrence
Attys
A.M. PHOTO-LITHO. CO. N.Y. (OSBORNE'S PROCESS.)

UNITED STATES PATENT OFFICE.

JOHN RICHARDS, OF COLUMBUS, OHIO.

GUIDE AND SUPPORT FOR SCROLL-SAWS.

Specification forming part of Letters Patent No. 35,390, dated May 27, 1862; Reissue No. 1,527, dated August 25, 1863.

*To all whom it may concern:*

Be it known that I, JOHN RICHARDS, of Columbus, in the county of Franklin and State of Ohio, have invented a new and useful Method of Guiding and Supporting Scroll-Saws; and I do hereby declare that the following is a full, clear, and exact description of one practical means for carrying out my invention, reference being had to the accompanying drawings, forming part of this specification, in which—

Figure 1 is a perspective view of a portion of a table and a saw-blade of a "scroll-saw mill" with my invention applied to the same; Fig. 2, a longitudinal section of the same connected to the suspending stud of the building. Fig. 3 is a horizontal section through the guide and support.

The same letters of reference, where used in the different figures, indicate corresponding parts.

It has long been a desideratum to obtain a scroll-saw mill which will work successfully while the upper end of the saw-blade is left free from a sash or upper straining device, and this has never been attained until the development of my invention, which consists, first, in working the saw at a point above the table in a groove which is inclosed by anti-friction material, such as steel, polished iron or glass, or any other known and suitable metal or substance, the upper end of the saw being disconnected from any upper suspender or sash, but supported and guided at its back edges and at its sides or broad faces, and its lower end connected to any mechanical device that will produce the desired motion in the saw.

It consists, second, in an adjustable guide and support whereby different thicknesses of scroll or web saw may be used at will.

It consists, third, in attaching the anti-friction guide and support to an adjustable device, which constitutes a guard to hold down the stuff being sawed, and also insures a support to the saw at a point near where the sawing is performed, as well as above this point.

My principle of operating scroll or web saws must not be confounded with the "muley-saw," as in the muley-saw it is common to employ guides attached to the saw, such guides running in or upon bearings independent of the saw-plate, whereas with the web or scroll saw, worked according to my discovery, the back of the blade or plate is supported upon a hardened-steel or other durable anti-friction surface, and is guided laterally by similar surfaces, so that the saw is supported and guided without any means of tension being employed. Furthermore, muley-saws are supported at each end by cross-heads, and only in the center by lateral guides, and a saw must be employed that is strong enough in its cross-section to stand the work. Now, with my plan I support the saw down to the top of the wood being sawed, which is a new thing in this class of saw-mills, and enables me to use small light saw-blades.

Previously to my discovery of running the upper end of the web or scroll saw in frictional contact with an upper guide it was deemed an unpracticable thing, and it is now only by practical demonstration and long use that saw-mill men are convinced that such method of working scrolls or web-saws will not cut through and rapidly wear out the guide.

The non-destruction of the guide in a short period of time, although the pressure upon it is immense, is due to the fact of the guide being of hardened steel or other smooth hard material over which the saw-plate glides with but little frictional wear.

To enable others skilled in the art to make and use my invention, I will proceed to describe one practical means in which I have embodied it with great success; but in doing so I do not wish to be understood as limiting myself to these mechanical devices in themselves, as the principle may be embodied in various other means and still not depart from the discovery embodied in machinery that I desire to patent.

Not using a sash or other means of straining the saw S, I fasten the lower end of the blade to the upper end of a stock or slide, $S'$, of a pitman by a set-screw, $S^2$, or I may otherwise connect this end of the blade to a device which will properly operate the saw. The upper end of the saw above the table T, I leave entirely disconnected; but in order to steady or guide and support this free end during the sawing operation, I attach a grooved steel guide to a strip, A, or other device, which will answer as a firm support to the guide, and as a guard to keep down the lumber being sawed.

The device A is attached to a stud or timber, B, of the building, and is better if made adjustable by means of a slot and clamp-bolt, such as designated by the letters *e c d;* but other known means for adjusting this device may be adopted.

The guide, as shown, is formed of three parts—to wit, a back plate, *b*, and two side plates, *a a*, which latter are bolted or screwed firmly to the former, as shown. The slots *s*, through which the bolts *f f*, pass are large enough to allow the plates *a a* a slight lateral adjustment whenever it is desired to use a saw with a greater thickness or a thinner saw. The same end—viz., the formation of a steel guide or a guide of hard anti-friction surface—would be attained if a groove were formed in a thick steel plate or other hard substance, except the advantage of accommodating saws of various thicknesses.

I believe I am the first to use the grooved anti-friction guide, as well as the first to have the groove variable in width, and therefore I do not confine myself to adjustable guides and supports.

The office of the back part of the groove or guide is to support the saw against the strain of the timber on the teeth when the work is being shoved against it, while the office of the lateral portions of the groove or guide is to keep the saw in a true vertical line and prevent it from twisting. The office of the guard A, which extends down nearly to the top of the table, is to hold down or prevent flying up of the "stuff" or timber being sawed, and at the same time bring the supporting-guide to the saw right down to the place where the sawing is being performed, and thus insure the most perfect operation, as well as an effectual supporting and guiding of the saw.

This guard by its arrangement obviates the heretofore necessity of leaving the upper end of the saw-blade above the table unsupported and unguided, as it allows of the work or timber being freely turned while the sawing is progressing, a clear open space between the guard and the table being left.

In the drawings I have shown the lower end of the guide forming an angle. This is to give a longer guard-surface. This angular portion has a kerf, *g'*, cut in it to admit the saw-blade to the back of the guide. I, however, do not limit myself to this form of guide.

Having thus described my invention and shown one means for carrying it out practically, what I claim, and desire to secure by Letters Patent, is—

1. Running the upper portion of a web or scroll saw above the table in a groove of an anti-friction guide and support, substantially as and for the purpose described.

2. Operating practically an unstrained web or scroll saw by combining with such saw-mills an upper anti-friction guide, which supports the back of the saw-blade, and also sustains the saw-blade at its sides or faces, substantially as set forth.

3. The use of anti-friction guides as a substitute for straining devices, in combination with web or scroll saw-blades, the guide to be raised and lowered to suit the thickness of the stuff, substantially as set forth.

4. An anti-friction guide which is adjustable, so as to accommodate different thicknesses of saw-blades, and to compensate for wear, in combination with the upper portion of a web saw-blade, substantially as set forth.

5. The combination of the anti-friction saw support and guide, or the equivalent thereof, with an adjustable guard, or its equivalent, substantially as and for the purpose set forth.

JOHN RICHARDS.

Witnesses:
C. BLANKNER,
H. A. LAMNAN.